United States Patent [19]
Buntin et al.

[11] 3,947,537
[45] Mar. 30, 1976

[54] BATTERY SEPARATOR MANUFACTURING PROCESS

[75] Inventors: Robert R. Buntin; Walter A. Morgan, both of Baytown, Tex.

[73] Assignee: Exxon Research & Engineering Co., Linden, N.J.

[22] Filed: July 20, 1973

[21] Appl. No.: 381,104

Related U.S. Application Data

[63] Continuation of Ser. No. 163,207, July 16, 1971, abandoned.

[52] U.S. Cl. ............... 264/137; 136/146; 136/148; 264/134; 264/136; 264/324
[51] Int. Cl.² ..................................... B29D 27/00
[58] Field of Search ........... 264/324, 134, 136, 137, 264/119; 136/146, 148

[56] References Cited
UNITED STATES PATENTS

| | | | |
|---|---|---|---|
| 2,482,062 | 9/1949 | Hanson | 136/146 |
| 3,084,091 | 4/1963 | Volkman | 136/148 X |
| 3,231,650 | 1/1966 | Findlay | 264/324 X |
| 3,272,657 | 9/1966 | Zenczak | 136/148 |
| 3,329,559 | 7/1967 | Corbin | 136/146 |
| 3,351,495 | 11/1967 | Larsen | 136/146 |
| 3,354,247 | 11/1967 | Zehender | 264/119 |

*Primary Examiner*—Richard R. Kucia
*Attorney, Agent, or Firm*—K. S. Myers; David A. Roth

[57] ABSTRACT

Battery separators are produced from nonwoven mats of thermoplastic fibers by wetting the fibers with a surfactant-water mixture to modify the surface properties of the fibers in the nonwoven mat, vaporizing the water while depositing the surfactant on the fibers, heating the nonwoven mat prior to compressing and then compressing to increase the fiber-to-fiber bonding as well as to form the desired structure. During compressing, ribs may be formed by using appropriate embossed rolls or press plate patterns. After the compressing step, slitting, cooling and cutting steps are carried out to produce a battery separator of the desired dimensions.

5 Claims, 8 Drawing Figures

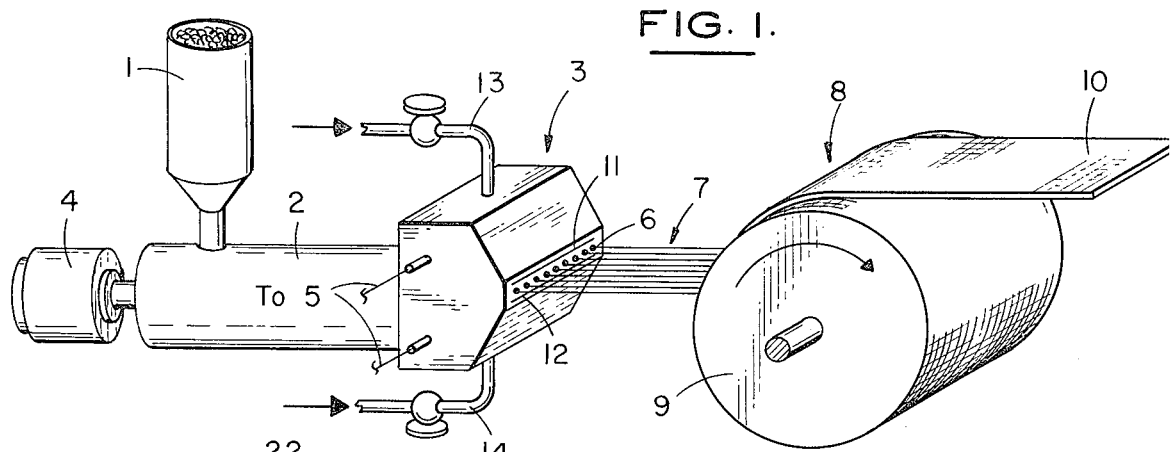
FIG. 1.
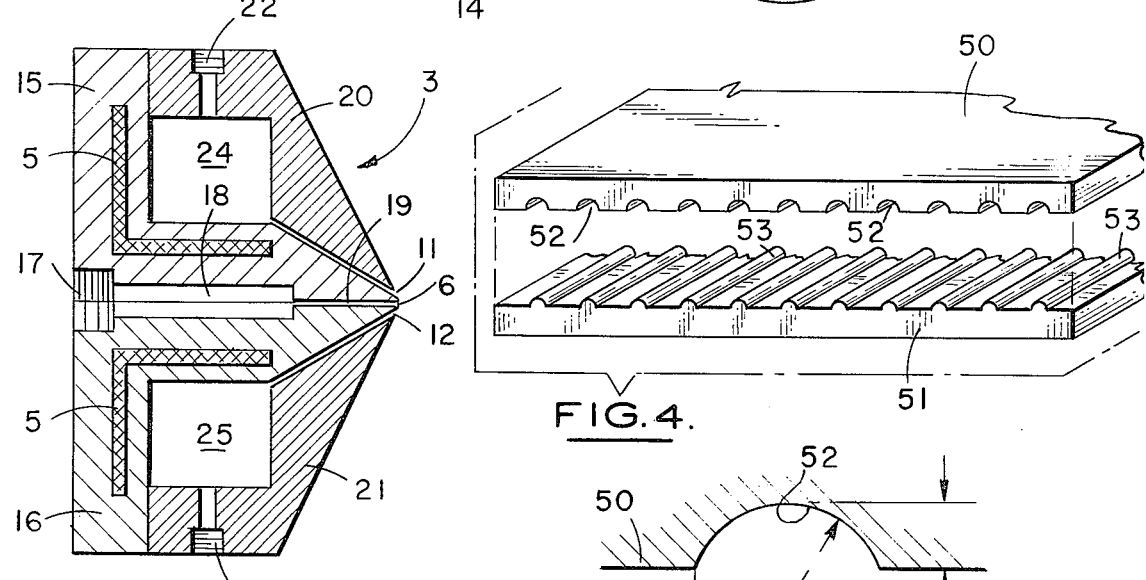
FIG. 2.
FIG. 4.
FIG. 4A.
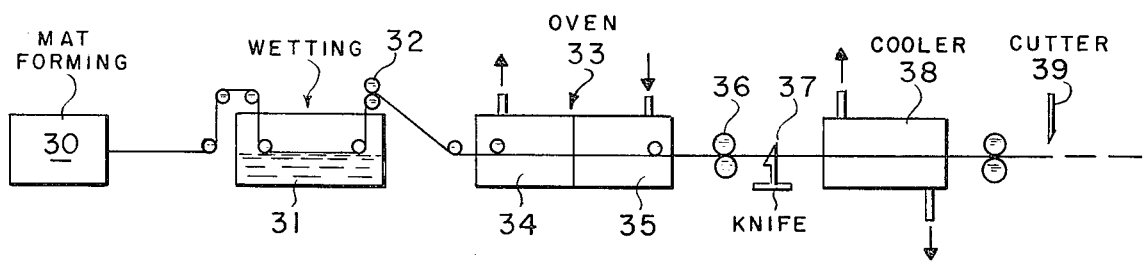
FIG. 3.
INVENTORS.
ROBERT R. BUNTIN,
BY WALTER A. MORGAN
ATTORNEY.

ROBERT R. BUNTIN,
WALTER A. MORGAN,
INVENTORS.

BY
ATTORNEY.

BATTERY SEPARATOR MANUFACTURING PROCESS

This is a continuation of application Ser. No. 163,207, filed July 16, 1971, now abandoned.

BACKGROUND OF THE INVENTION

1. Field of the Invention

The present invention is directed to a process for producing battery separators from nonwoven mats of thermoplastic fibers. More specifically, the present invention relates to nonwoven structures produced from a mat of randomly laid, self-bonded fibers, preferably polypropylene, polystyrene or mixtures thereof, which are wetted by a surfactant to modify the surface properties of the fibers in the nonwoven mat.

2. Prior Art

The currently commercially used battery separators are mainly of two types: (1) resin impregnated paper, and (2) microporous rubber. The most commonly used material in auto batteries is resin impregnated paper; however, this material is brittle and is more susceptible to acid deterioration than is desirable. The microporous rubber separators are also more brittle than is desired and are much more costly than the resin impregnated paper. The microporous rubber separators are used mostly in industrial battery applications.

Battery separators made from polyolefins, specifically polypropylene, are illustrated in the following patents:

| | |
|---|---|
| U.S. 3,002,040 | U.S. 3,092,438 |
| U.S. 3,026,366 | U.S. 3,216,864 |
| U.S. 3,045,058 | U.S. 3,314,821 |
| U.S. 3,055,966 | U.S. 3,351,495 |
| U.S. 3,084,091 | U.S. 3,354,247 |

SUMMARY OF THE INVENTION

The present invention is directed to the process for converting a nonwoven mat of thermoplastic fibers into a battery separator. More specifically, the present invention is directed to a process which may include the following steps to produce battery separators from nonwoven mats: wetting the fibers with a surfactant-water mixture to modify the surface properties of the fibers in the nonwoven mat, wringing from the nonwoven mat excess surfactant-water mixture, vaporizing the water from the surfactant-water mixture while depositing the surfactant on the fibers, preheating the nonwoven mat, compacting the heated nonwoven mat to increase fiber to fiber bonding, forming a rib structure or ribs on the nonwoven mat which provides the mechanical spacing between the plates in the battery, fixing the overall thickness by partially flattening the ribs, slitting the ribbed nonwoven mat to a desired width, cooling the ribbed nonwoven mat, and cutting the ribbed nonwoven mat to a specific height suitable for a specific battery cell design.

BRIEF DESCRIPTION OF THE DRAWINGS

FIG. 1 is a schematic view of the overall melt-blowing process;

FIG. 2 is a cross-sectional view of the die;

FIG. 3 is a schematic view of a battery separator manufacturing process;

FIG. 4 is a schematic view of a battery separator press plate;

FIG. 4A is a detail of said press plate;

DESCRIPTION OF THE PREFERRED EMBODIMENTS

Figure 5:
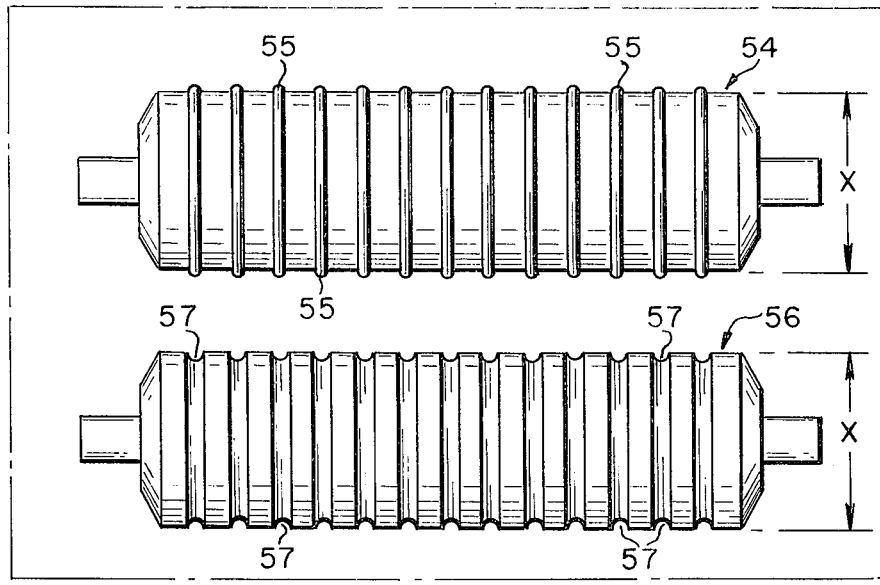
FIG. 5 is a schematic view of embossing rolls used to produce battery separators.
Figure 6:
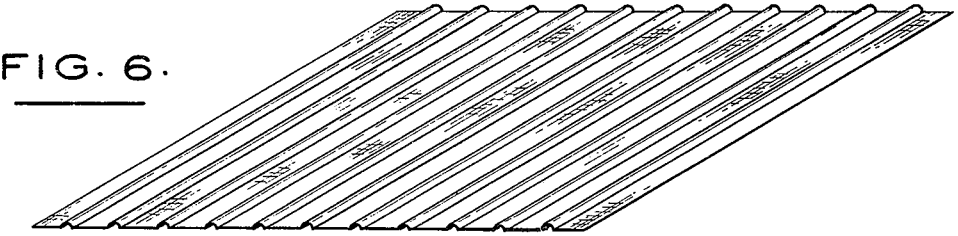
FIG. 6 is a schematic view of a nonwoven battery separator with embossed ribs.
Figure 6A:
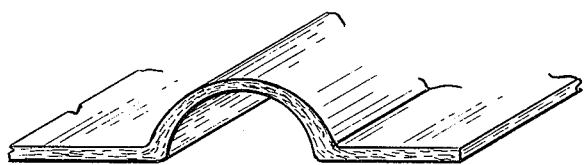
FIG. 6A is a detail of one of the embossed ribs of said nonwoven battery separator.

Referring to FIG. 1 of the drawings, polypropylene, which is the preferred material although polystyrene or mixtures of polystyrene and polypropylene may be used, is introduced into a pellet hopper 1 of an extruder 2. The polypropylene used in the present invention has either been thermally treated before being introduced into the extruder 2 or is thermally treated in the extruder 2 and/or die head 3. According to the present invention, the polypropylene is added into the hopper 1 and then is heated in extruder 2 at temperatures in excess of 600° F. and preferably within the range of 620° to 800° F. After thermal treatment, the polypropylene is forced through the extruder 2 by a drive motor 4 into the die head 3. The die head 3 may contain a heating plate 5 which may also be used in the thermal treatment of the polypropylene before it is melt-blown. The polypropylene is then forced out a row of die openings 6 in the die head 3 into a gas stream which attenuates the polypropylene into fibers 7 which are collected on a moving collecting device 8 such as a drum 9 to form a continuous mat 10. The gas stream which attenuates the polypropylene is supplied through a gas jet 11 and 12, respectively. These gas slots 11 and 12 are supplied with a hot gas, preferably air, by gas lines 13 and 14, respectively.

The melt-blowing process may be further understood by considering the details of the die head 3 which is set forth in cross-section in FIG. 2. The polypropylene is introduced into the back of the die plates 15 and 16 through an inlet 17. The polypropylene then goes into a chamber 18 between the upper and lower die plates 15 and 16, respectively. The facing of the die plate 16 has milled grooves 19 which terminate in the die openings 6. It is understood, of course, that the mill grooves may be in the lower die plate 16, in the upper die plate 15, or grooves may be milled in both plates 15 and 16. An upper gas cover plate 20 and a lower gas cover plate 21 are connected to the upper die plate in lower die plate 15 and 16, respectively. The hot gas is supplied by inlets 22 in upper air plate 20 and lower inlet 23 in lower gas plate 21. Suitable baffling means (not shown) may be provided in both the upper air chamber 24 and lower air chamber 25 to provide a uniform flow of air through the gas slots 26 and 27, respectively. As shown in FIG. 2, the rear portion of the die head 3 may contain heating means 5 for heating both the polymer and air in the die head 3.

The gas flow is controlled so that the fibers as they are attenuated do not come into contact one with the other which results in "rope" and fiber bundles. The gas, preferably air, is heated and the flow controlled to produce very fine fibers (less than 10 microns). Suitable polypropylene mats have been obtained at air rates between 0.7 and 4 pounds/minute and the polypropylene fibers are attenuated in the gas stream at those rates such that their average diameter is between 1 to about 10 microns.

The fibers are collected as a selfsupporting mat on a collecting device such as a rotating drum at distances of about 1 to 18 inches from the die openings. Preferably a mat of self-bonded fibers is collected at a distance between 3 to 8 inches. A "self-bonded" mat as used herein means that the mat is a coherent, integral structure capable of withstanding normal handling such as winding, unwinding, cutting, pressing, calendering, etc. without losing its essential mat-like character. In most mats used in the present invention, some thermal bonding occurs. The mat produced by the melt-blowing process is produced so as to have a basis weight of between 60 and 500 grams/square meter. The thickness of the nonwoven mat may vary between 20 and 200 mils.

To produce a battery separator from the nonwoven mat produced by the melt-blowing process 30, the mat must be subjected to wetting so as to modify the surface properties of the fibers in the nonwoven mat so they may be wet by battery acid, usually a 35 percent sulfuric acid solution. To avoid trapping of air in the mat, the wetting solution must enter the mat from one side only and spread through the mat by capillary action. To accomplish this wetting action, a spray of wetting solution may be sprayed on one side of the mat (not shown) or the mat may be "floated" across a surface of the wetting solution in a shallow container 31. The wetting action may be carried out at a temperature between 60° and 170° F. Suitable surfactant materials for use as wetting solutions are anionic surfactants, such as aliphatic sulfates, for example, sodium dioctylsulfosucinate (commercially sold as Aerosol-OT) or non-ionic surfactants such as polyethylene oxy compounds, for example, nonylphenoxy poly (ethyleneoxy) ethanol (commercially sold as IGEPAL CO-730), or alkylarylpolyether alcohol (commercially sold as TRITON X-100). The nonwoven mat is preferably saturated with the wetting solution. The wetting solution however may be from about 0.2 to about 1.0 weight percent in distilled water.

Upon leaving the wetting operation, the mat may contain a surplus amount of wetting solution. This excess surfactantwater mixture may be removed from the mat by passing it through a pair of constant gap wringer rolls 32. The wringer rolls 32 must be power driven to apply the force necessary to provide the wringing action. The gap between the wringer rolls may be about 15 percent of the initial dry mat thickness in order to produce a mat which contains between 60 and 80 percent liquid (by weight) after the wringing operation per unit weight of dry mat.

The nonwoven mat is then subjected to a drying operation so as to remove the water from the surfactant-water mixture in the pores of the mat while at the same time leaving the surfactant as a uniform layer on the surface of the fibers. Most types of dryers are not satisfactory for this drying operation since they volatilize the water so violently that the surfactant is also carried away with the water vapor. According to the present invention, a satisfactory dryer is a hot air countercurrent oven 33. The hot air countercurrent oven 33 has been found to vaporize the water from the surfactant-water mixture while allowing the surfactant to deposit uniformly on the fibers. The surfactant level in the dried mat may be in an amount of between 0.3 and 1.0 percent by weight, a suitable amount being 0.4 percent by weight.

To produce a suitable battery separator, the mat must be compacted to obtain the desired thickness and porosity as well as the mechanical properties of strength and abrasion resistance. Prior to the compacting operation, if the mat is heated to elevated temperatures, increased fiber-to-fiber bonding will occur during compaction. The maximum average temperature that the mat can sustain prior or during compaction differs for polypropylene as compared to polystyrene or mixtures thereof, but in general is limited by excessive shrinkage of the mat, polymer degradation or melting. For a mat of polypropylene fibers, satisfactory mat temperatures to which the mat is heated prior to compacting are from about 255° F. to 300° F. A preferred temperature is between about 270° F. and 290° F. In a continuous process, the most convenient way of heating the mat to these temperatures is in the countercurrent oven wherein the mat is preheated in an extension of the oven 33 with two zones of temperature control — one zone for the drying operation 34 and one zone for the preheat operation 35.

To produce a suitable battery separator, the nonwoven mat must be compacted to obtain the desired thickness and porosity as well as the mechanical properties of strength and abrasion resistance. The nonwoven mat is compacted to a thickness of between 10 and 40 mils to be useful as a battery separator in most batteries. The purpose of the web compaction operation is not only to bond the fibers together by means of heat and pressure but also to obtain a structure possessing the desired mechanical and electrical properties. The compacting operation is preferably carried out by utilizing calender rolls, however, a press may also be used to obtain a nonwoven mat of fixed thickness. In either case, compacting using a fixed gap is preferred and the nonwoven mat is calendered or pressed so that the compacted mat has a void fraction of at least 40 percent or 0.40, and preferably a void fraction of 0.50 to 0.65. Calender roll or press plate temperatures during the compacting operation range between 270° F. and 300° F. for polypropylene nonwoven mats. It is preferred to use a Teflon coated calender roll or press plate. A spacer material may be utilized between the nonwoven mat and the pressing surface. Examples of such materials which may be used as spacers are kraft paper, tissue paper, writing paper, fine cotton cloth, linen, etc., which have a rough surface.

The nonwoven battery separators of the present invention are useful in the lead-acid batteries of the SLI-type (starting, lighting and ignition) and the industrial type. These batteries have positive electrodes and negative electrodes which are separated by the battery separators. It has been found that a nonwoven mat having a basis weight between 60 to 300 grams/square meter is preferred for producing battery separators of this type. The nonwoven mat is compacted to a thickness which may be between 10 to 35 mils and a porosity preferably of 50 percent or greater. The maximum pore size in a nonwoven mat of the present invention is generally below 25 microns in the better quality sheets. The maximum pore size is a measurement of the largest pore or opening in the compacted structure to be used as a battery separator and is measured essentially by the ASTM-D-128-61 test procedure entitled Maximum Pore Diameter and Permeability of Rigid Porous Filters For Laboratory Use. The maximum pore size of a battery separator is very important. Low maximum pore size means an effective barrier to active material growing through and bridging between opposite plates of the battery and thereby causing shorting. In order to achieve low electrical resistance, a high percent porosity in the nonwoven mats of the present invention is required. For any nonwoven mat of given fiber size, increasing percent porosity also increases maximum pore size because the distance between adjacent fibers increases. An effective way to decrease maximum pore size at a high percent porosity is to decrease the fiber size in the nonwoven mat. By forming the same weight of thermoplastic into very small fibers and randomly distributing these fibers, the fiber-to-fiber distance is reduced and thus smaller maximum pores may be obtained. The very small fiber sizes (1–10 micron) utilized in the present invention thus make possible the combination of low electrical resistance and low maximum pore size in the nonwoven mat.

Most lead-acid batteries use a type of cell construction which relies upon the battery separator to establish the mechanical spacing between the plates. This spacing is controlled by a means of ribs formed in or attached to the mat. According to one aspect of the present invention, the embossing operaion to provide an adequate rib structure is carried out at the same time as the compaction operation. Referring to FIGS. 4 and 5, a suitable press plate pattern is shown in FIG. 4 and a suitable embossing roll is shown in FIG. 5. Since the embossing and web compaction operations are done at the same time, the plate or embossing roll temperatures are maintained in the same range as that for compaction; i.e., 275° F. to 300° F. for polypropylene nonwoven mats. Referring specifically to FIG. 4, a specific plate pattern is shown. Upper press plate 50 and lower press plate 51 would come into compression with the nonwoven mat therebetween. Upper press plate 50 has 11 grooves 52 which may be spaced at 0.544 inches and each of said grooves having a 5/64 inch radius (see FIG. 4A). The overall dimensions of one set of plates were 12 inches by 12½ inches. Lower press plate 51 has 11 ribs 53 spaced so as to be mutually compatible with grooves in upper press plate 50, however, the radius of the ribs 53 are 3/64 inch radius. The depth of the groove and the height of the rib may be the same and may, for example, be 0.030 or 0.035 inches. It is to be understood that these specific dimensions are set forth only to provide a specific embodiment found suitable for the press plate design for a battery separator.

Instead of press plates, embossing rolls may be utilized and as shown in FIG. 5, a male embossing roll 54 having ribs 55 may be employed. Exemplary of the spacing of ribs is an 0.544 inch rib spacing having a total of 13 ribs 55. The diameter X of the male embossing roll is identical to the diameter of the female embossing roll 56 having the same number 13 grooves 57 therein. Again the spacing of the grooves is the same as the spacing in the ribs and it is preferred that the radius of the grooves is greater than the radius of the ribs, although the depth of grooves and the height of the rib are preferably identical. Suitable radius for the height of the ribs 55 is 0.047 inches with a rib height of 0.040 inches. These dimensions are used with a female groove having a diameter of 0.067 inches and a depth of 0.040 inches.

Following the rib formation and compacting operation, the embossed mat may be passed through a second set of fixed gap calender rolls. These calender rolls have a smooth surface and may be operated at either room temperaure or up to 290° F. The purpose of the second set of calender rolls is to partially flatten the ribs formed in the previous step so that the battery separator has a uniform overall thickness. This operation is optional, but may be very desirable when different overall thicknesses of nonwoven mats are produced, but wherein a uniform overall thickness of the battery separator is required or desired.

The specific dimensions of a battery separator will vary for each cell design and accordingly the slitting and cutting are carried out to meet a specific cell design as regards to dimensions. It has been found according to the present invention that the slitting operation is best carried out immediately after the mat leaves the nip of the calendar rolls when the mat is compacted and embossed by calendering. If press plates are used, it is also desirable to slit the mat immediately after pressing since the mat is quite hot after this operation, which facilitates slitting of the mat with a knife 37 or razor with little difficulty and also with precision as to the rib pattern being produced.

After the slitting operation, the mat is still warm and it has been found that if the mat is cooled prior to cutting, a battery separator of better mechanical properties will be produced. The heat in the nonwoven mat may be removed by natural convective air circulation or cooling air may be provided through cooler 38 (FIG. 3). In either case, the nonwoven mat temperature should be reduced to at least 140° F. prior to reaching the cutter nip. The nonwoven mat is then cut to a desired dimension for a particular battery cell design. A guillotine cutter 39 may be used to cut the nonwoven mat into the desired dimensions for a battery separator.

The present invention will be further illustrated by the following specific examples which are given by way of illustration and not as limitations on the scope of the invention.

EXAMPLES 1–2

Nonwoven polypropylene mats were produced by the melt-blowing process under the following conditions in Table I hereinafter.

TABLE I

| Example | 1 | 2 |
| --- | --- | --- |
| Resin | —33.6 melt flow rate — | |
| Die Temp. °F. | 550 | 580 |
| Air Temp. °F. | 560 | 644 |
| Polymer Rate gm/min. | 6.2 | 7.9 |
| Air Rate lbs./min. | 1.07 | 1.27 |
| Collector distance in. | 4.0 | 6.0 |
| RPM | 34 | 1.0 |

The polypropylene fibers in the mats produced in Examples 1 and 2 were of a diameter of 2 microns or less. The basis weight of the mat produced in Example 1 was 300 grams per square meter. Mats were produced under the conditions of Example 2 having basis weights varying from 256 to 270 grams per square meter.

EXAMPLE 3

A polypropylene mat produced by melt-blowing and having a basis weight of 176.4 g/m$^2$ was continuously handled to produce battery separators. The mat was sprayed from one side with an 0.60 percent solution of Aerosol OT until substantially saturated and then passed through a pair of wringer rollers having an 0.012 inch wringer gap to remove excess wetting solution. The mat had approximately 70 percent moisture in the mat as the mat was passed into a dryer which consisted of a countercurrent oven. The temperature was 250° F. (230° F. actual) in the dryer. The mat was then passed into another zone of of the countercurrent oven wherein the temperature was separately controlled to a temperature of 290° F. to preheat the mat prior to compaction. The mat was then passed through a pair of calender rolls, both heated at 280° F., wherein the mat was compacted as well as forming ribs. The mat was slit to a width of 515/16 inches, cooled and cut by a guillotine cutter to a height of 5¾ inches. The battery separators were compacted to a weight of 4.2 gms/separator and had an electrical resistance of 0.022 ohms/in.$^2$, a maximum pore size of 15.4 microns (ASTM D-2499-66T Pore Size Characteristics of Membrane Filters for Use With Aerospace Fluids), a void fraction of 0.60 and a thickness of 0.021 inch (overall from top of rib to bottom of mat 0.047 inch).

EXAMPLE 4

Six rolls of polypropylene mats produced by melt-blowing and having basis weights varying from 159 to 178.6 gms/m$^2$ were continuously handled to produce battery separators. The rolls of mats were sprayed from above the mats with an 0.60 percent solution of Aersol OT. The wet mats were then passed through a pair of wringer rollers having an 0.012 inch wringer gap to remove excess wetting solution. The mat had approximately 70 percent moisture in the mat as the mat was passed into a dryer which consisted of a countercurrent oven. The temperature was 250° F. (220° F. actual) in the dryer. The mats were then passed into another zone of the countercurrent oven wherein the temperature was separately controlled to a temperature of 300° F. (290° F. actual) to preheat the mats prior to compaction. The mats were then passed through a pair of calender rolls, the top roll heated to 290° F. and the bottom roll heated to 285° F., wherein the mat was compacted as well as forming ribs. The mat was passed through the calender rolls at about 8 ft./min. The mats were slit to a width of 527/32 inches, cooled and cut by a guillotine cutter to a height of 5¼. The battery separators were compacted to a weight of 3.5 grams/separator and had an electrical resistance of 0.020 ohms/in.$^2$, a maximum pore size of 15.2 microns (ASTM D-2499-66T), a void fraction of 0.62 and a thickness of 0.021 inch (overall — 0.043 inch).

EXAMPLE 5

A polypropylene mat produced by melt-blowing and having a basis weight of 78.4 gms/m$^2$ was combined with another mat likewise produced by melt-blowing but having a basis weight of 96.6 gms/m$^2$. The combined mats were floated in an 0.20 percent Aersol OT solution at room temperature and thereafter allowed to dry overnight at room temperature. The wetting combined mats were then heated on a press to a temperature between 270°–280° F. and thereafter pressed for 10 seconds. One plate of the press had grooves and the other ribs so that ribs were formed in the nonwoven mats. The plates were each coated with Teflon and no press cloth was used. The compacted mats were slit and cut to a height of 5¼ inches and width of 527/32 inches. The compacted battery separators weighed 3.55 grams/separator and had an electrical resistance of 0.020 ohms/in.$^2$, a maximum pore size of 15.7 microns (ASTM D-2499-66T), a void fraction of 0.64 and a thickness of 0.021 inch (overall — 0.046 inch).

EXAMPLE 6

A polypropylene mat produced by meltblowing and having a basis weight of 88.8 grams/m$^2$ was treated in the same manner as the mats in Example 5 to produce battery separators of the same height and width. The compacted battery separators weighed 1.9 grams/separator and had an electrical resistance of 0.011 ohms/in.$^2$, a maximum pore size of 13.4 microns (ASTM D-2499-66T), a void fraction of 0.61 and a thickness of 0.010 inch (overall — 0.036 inch).

While polypropylene nonwoven mats are used to illustrate the present invention, polystyrene and blends of polypropylene and polystyrene have been melt-blown to produce mats which were wetted, dried, preheated, compacted, slit and cut into battery separators in the same manner as the polypropylene nonwoven mats.

The nature and object of the present invention having been completely described and illustrated and the best mode thereof contemplated set forth, what we wish to claim as new and useful and secure by Letters Patent is:

1. A method for producing a battery acid wettable nonwoven battery separator from nonwoven mats of polypropylene thermoplastic fibers, which mats before treatment are not wettable by at least a 35% sulfuric acid battery acid, which method comprises: wetting a nonwoven mat of said thermoplastic fibers with a surfactant-water solution at a temperature of 60° to 170° F., wherein said surfactant is cationic or nonionic and is present as a 0.2 to about 1.0 wt. % solution in said water by contacting only one side of said mat and permitting said solution to spread through said mat; vaporizing the water from the surfactantwater solution within said mat in a hot air countercurrent oven whereby said surfactant is evenly deposited in an amount of 0.3 to 1.0% by weight based on fibers of said nonwoven mat which is now essentially dry; then heating said nonwoven mat to a temperature in excess of the softening point of said thermoplastic fibers but insufficient to melt, shrink or degrade said fibers; and subsequently compressing said heated nonwoven mat to a void fraction of at least 0.4.

2. A method according to claim 1 wherein said nonwoven mat is passed through a mechanical wringer before the vaporizing of the water from the surfactant-water mixture.

3. A method according to claim 1 wherein said compressing includes forming ribs.

4. A method according to claim 1 wherein said nonwoven mat is comprised of polypropylene fibers and is heaed to a temperature of 255° to 300° F and compressed by male and female members heated within the range of 270° to 300° F.

5. A method according to claim 4 wherein said fibers are from 1–10 microns in diameter.

* * * * *